(12) United States Patent
Barr et al.

(10) Patent No.: US 10,836,008 B2
(45) Date of Patent: Nov. 17, 2020

(54) LOCATING DEVICE FOR USE WITH POWER TOOLS

(71) Applicant: Savvy Solutions, Inc., Earlysville, VA (US)

(72) Inventors: William Alexander Barr, Earlysville, VA (US); Deborah Fulton Barr, Earlysville, VA (US); William Harrison Fulton, White Salmon, WA (US)

(73) Assignee: Savvy Solutions, Inc., Earlysville, VA (US)

( * ) Notice: Subject to any disclaimer, the term of this patent is extended or adjusted under 35 U.S.C. 154(b) by 245 days.

(21) Appl. No.: 15/897,316

(22) Filed: Feb. 15, 2018

(65) Prior Publication Data

US 2018/0169815 A1    Jun. 21, 2018

Related U.S. Application Data

(63) Continuation of application No. 15/389,071, filed on Dec. 22, 2016, now abandoned, which is a
(Continued)

(51) Int. Cl.
*B23Q 17/00* (2006.01)
*B25F 5/00* (2006.01)
(Continued)

(52) U.S. Cl.
CPC .............. *B23Q 17/20* (2013.01); *B23C 1/20* (2013.01); *B25F 5/00* (2013.01); *B27C 5/10* (2013.01);
(Continued)

(58) Field of Classification Search
CPC ............ B27C 5/10; Y10T 409/306608; Y10T 408/21
(Continued)

(56) References Cited

U.S. PATENT DOCUMENTS 6,452,097 B1 * 9/2002 DeWall .................. H02G 1/00
174/58
8,272,813 B1 * 9/2012 Wise ..................... B23B 49/00
408/16
(Continued)

FOREIGN PATENT DOCUMENTS

DE    102006061581 A1 *  7/2008

OTHER PUBLICATIONS

Machine Translation of DE 102006061581, which DE '581 was published Jul. 2008.*

*Primary Examiner* — Erica E Cadugan
(74) *Attorney, Agent, or Firm* — Williams Mullen; Thomas F. Bergert

(57) ABSTRACT

A powered high-speed cutting tool that also locates objects behind sheet material and subsequently cuts around the object. The tool incorporates at least one sensor having a transceiver emitting a signal to detect at least one from the group of object density, conductivity, distance, and identification. The sensor is housed within a sensor unit that is part of the body of the cutting tool. The sensor unit can be incorporated into the body or removable from the cutting tool. A marking unit is used to mark the cutting area of the sheet material and is generally part of or located near a sensor unit. Indicator members, such as lights, audio, and/or display screen, are used to provide information to the user.

17 Claims, 12 Drawing Sheets

Related U.S. Application Data continuation-in-part of application No. 13/165,746, filed on Jun. 21, 2011, now abandoned.

(60) Provisional application No. 61/356,860, filed on Jun. 21, 2010.

(51) Int. Cl.
*B27C 5/10* (2006.01)
*B23C 1/20* (2006.01)
*B23Q 17/20* (2006.01)
*B23D 59/00* (2006.01)
*B23C 3/00* (2006.01)

(52) U.S. Cl.
CPC ............ *B23C 3/00* (2013.01); *B23C 2226/41* (2013.01); *B23D 59/001* (2013.01); *Y10T 29/5176* (2015.01); *Y10T 408/05* (2015.01); *Y10T 408/21* (2015.01); *Y10T 409/306608* (2015.01); *Y10T 409/308008* (2015.01)

(58) Field of Classification Search
USPC .............. 409/175–182; 144/136.95, 154.5; 408/16
See application file for complete search history.

(56) References Cited

U.S. PATENT DOCUMENTS

| | | | | |
|---|---|---|---|---|
| 8,517,642 B2 * | 8/2013 | Borunda | ................ | B23B 49/00 324/67 |
| 2013/0243538 A1 * | 9/2013 | Hu | ........................ | B25F 5/021 408/16 |

* cited by examiner

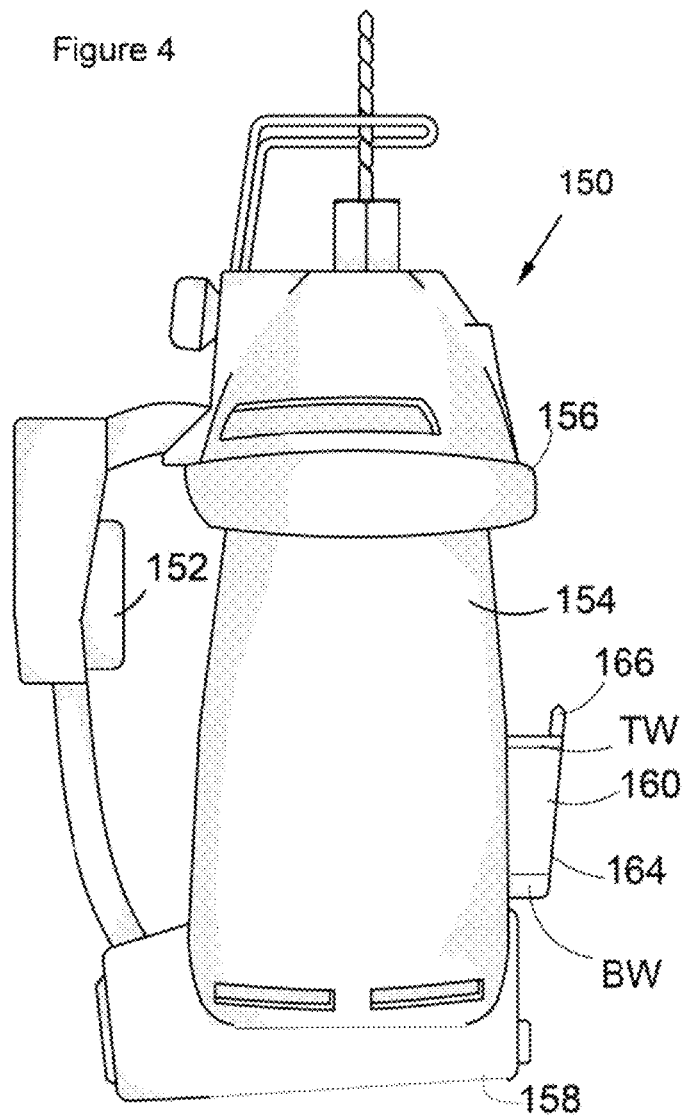

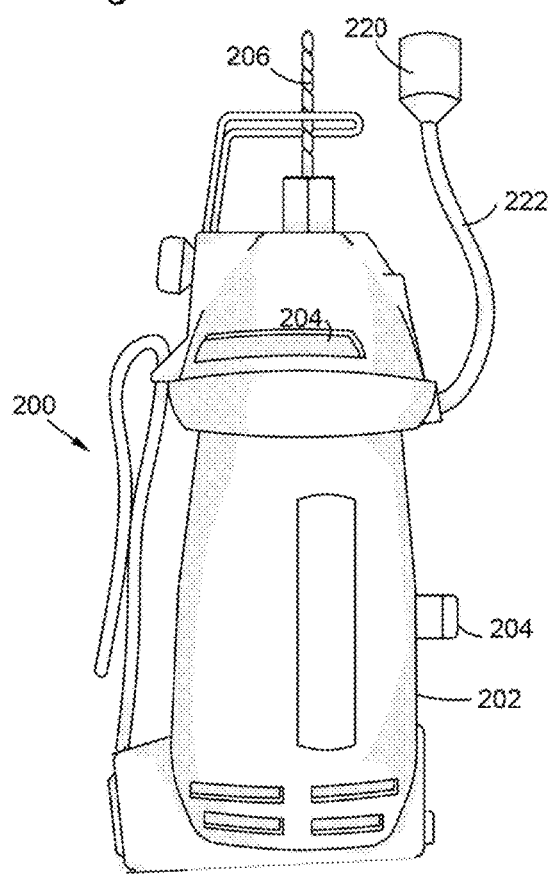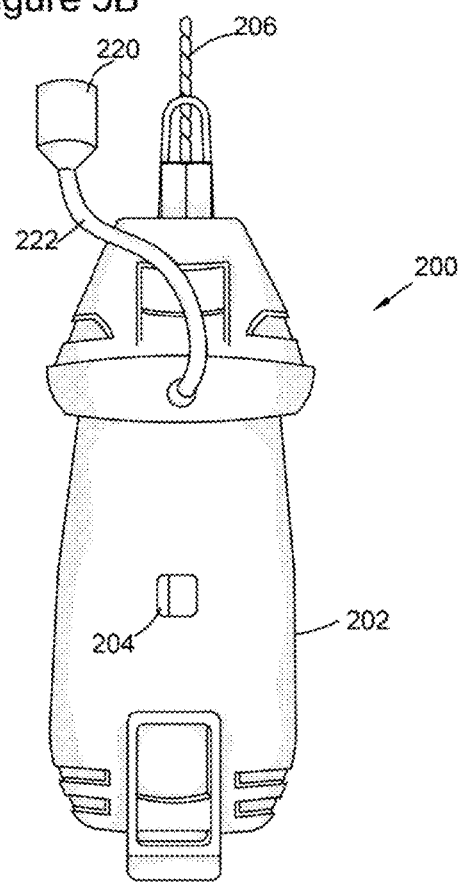

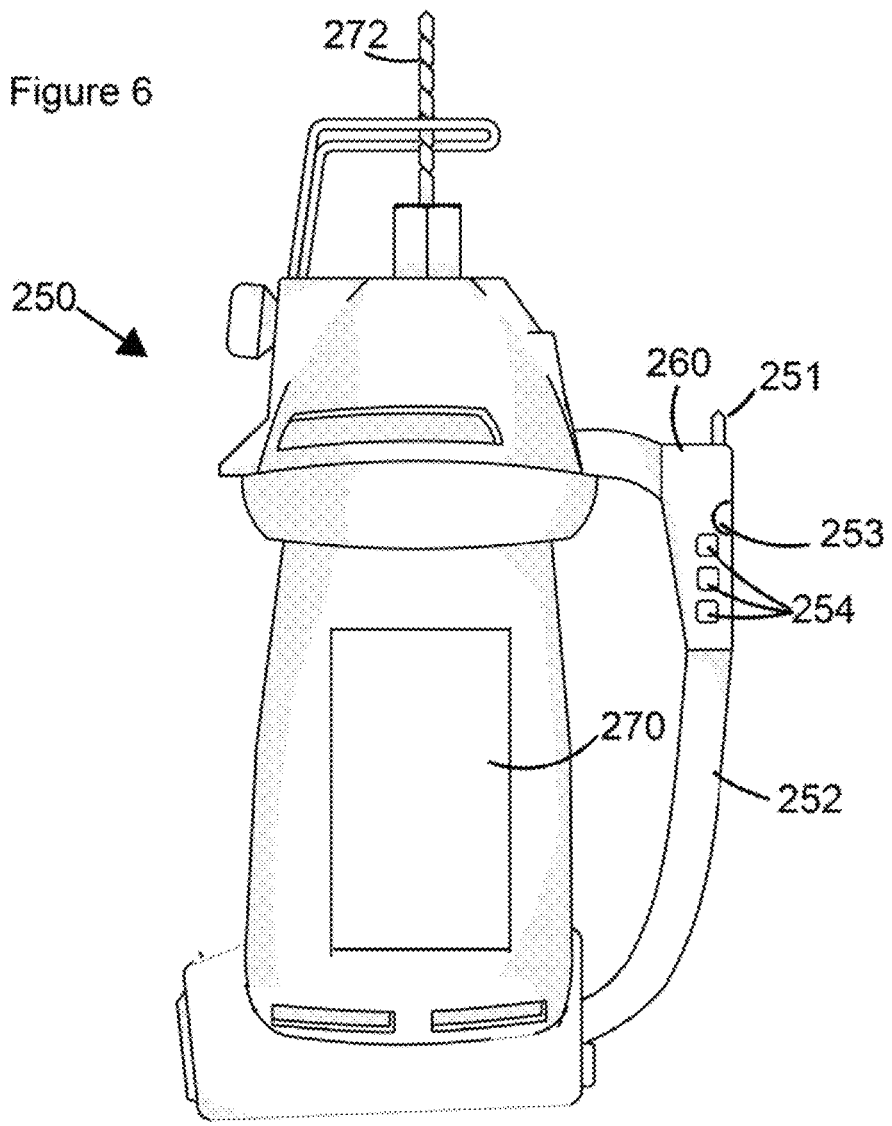

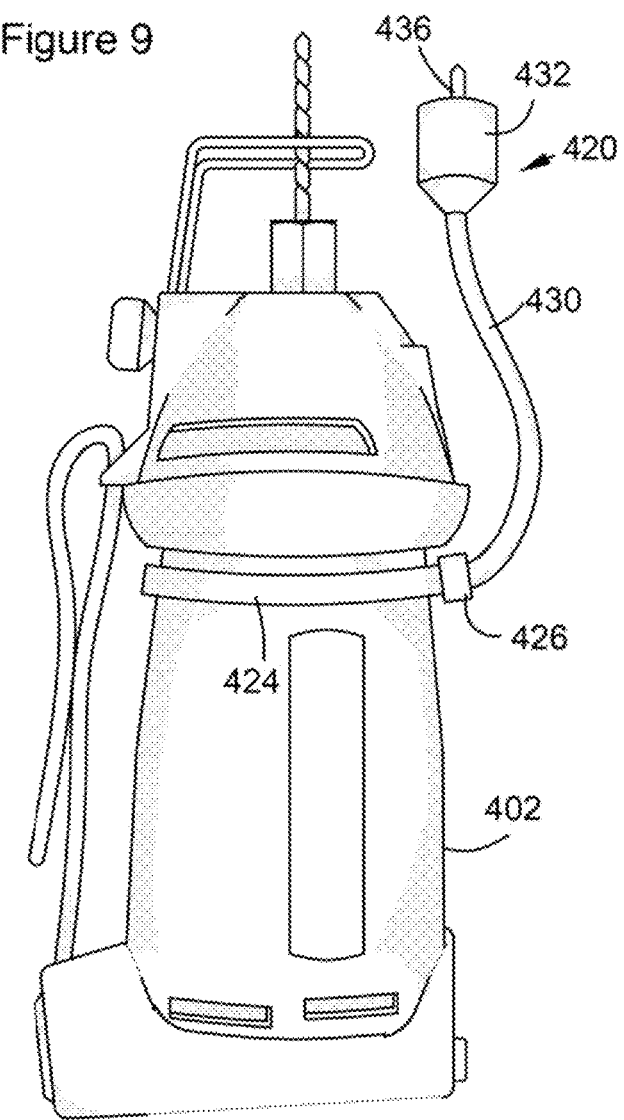

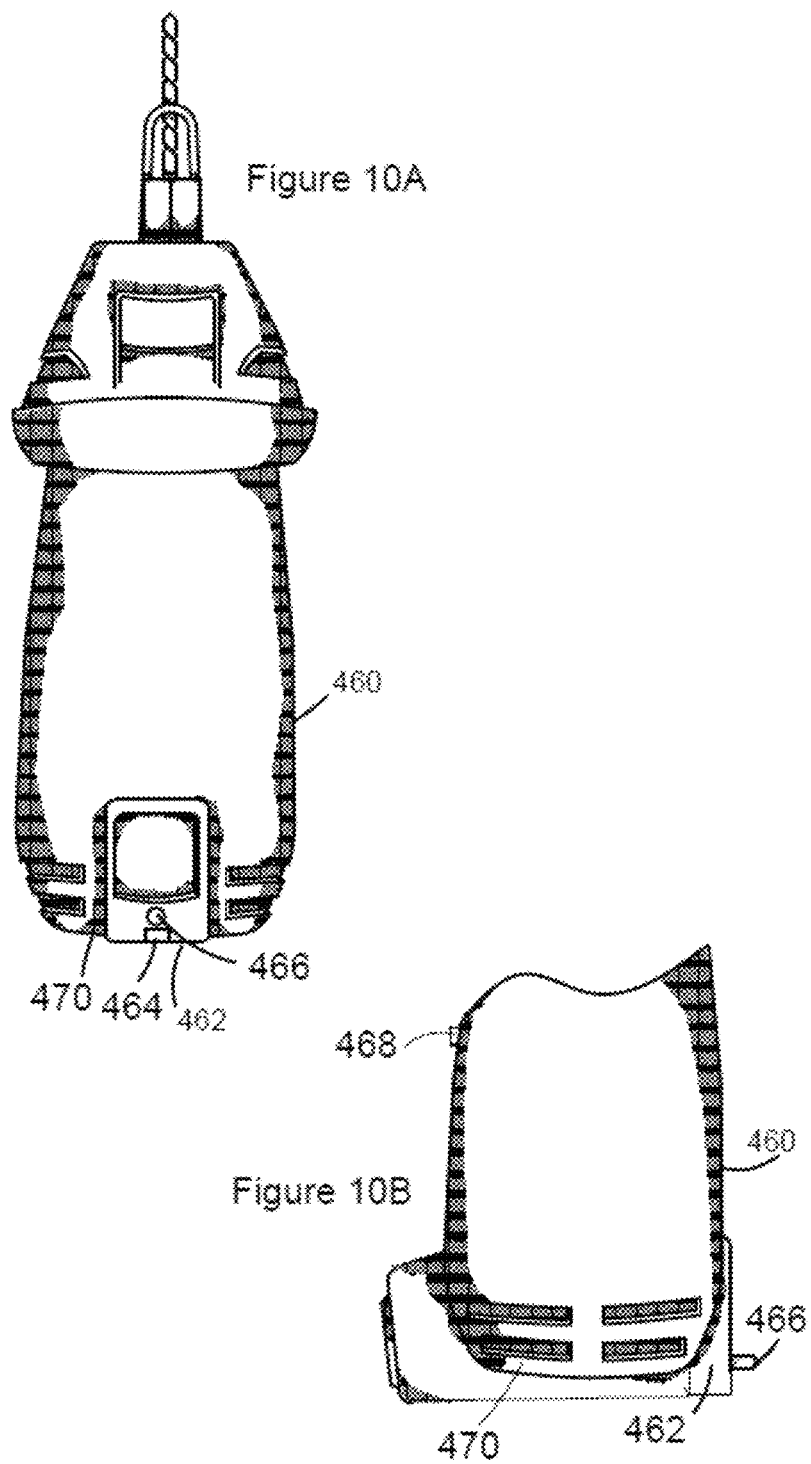

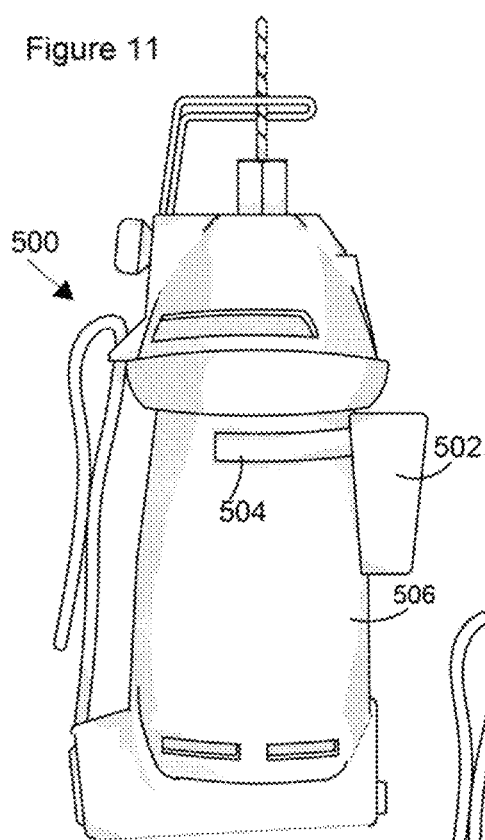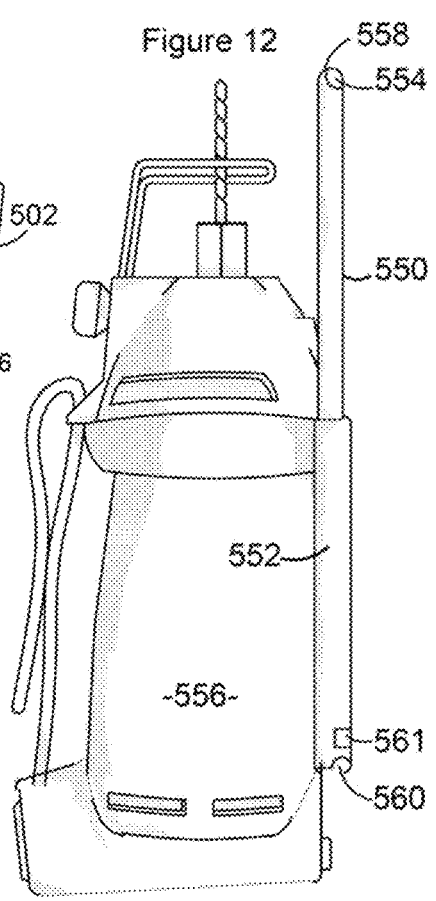

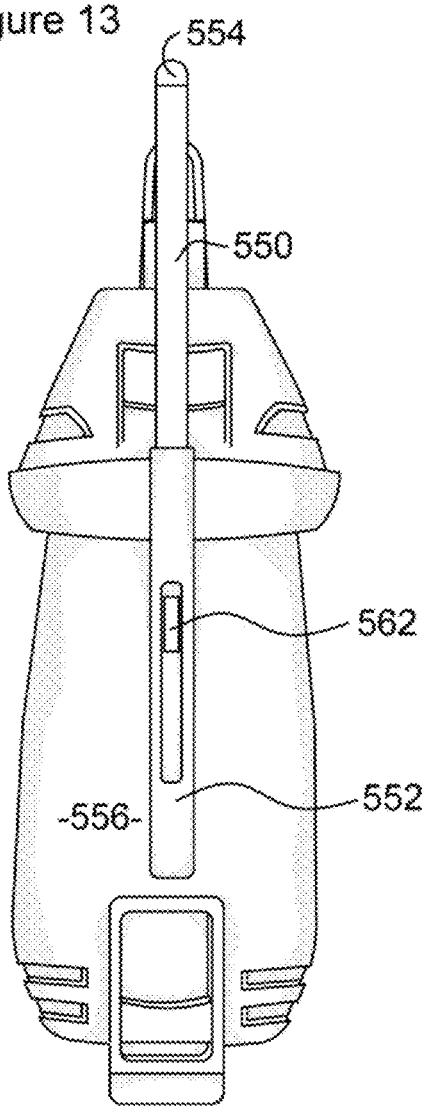

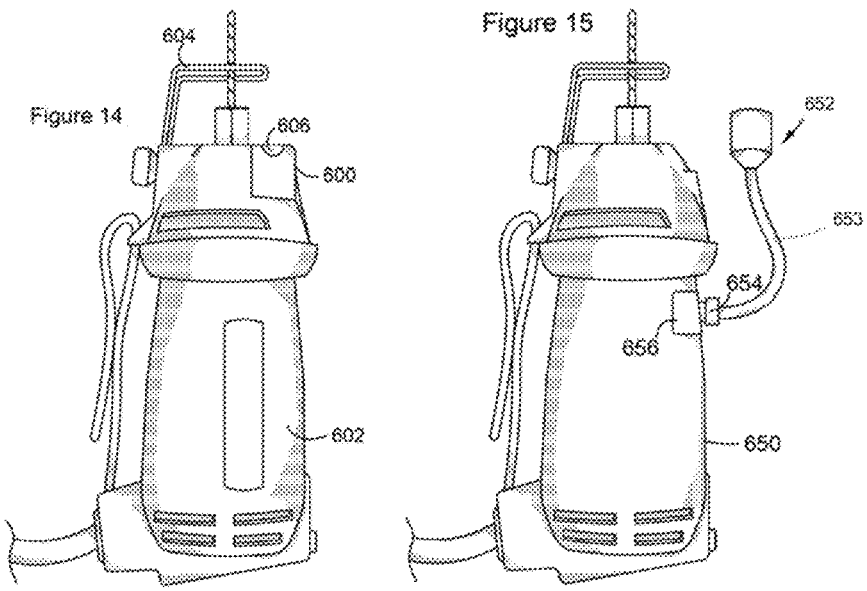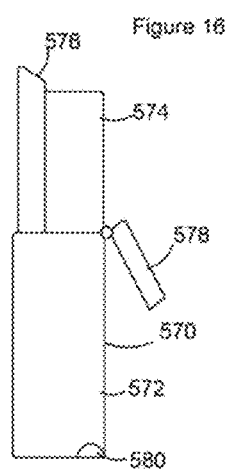

LOCATING DEVICE FOR USE WITH POWER TOOLS

CROSS REFERENCE

This application is a continuation of U.S. application Ser. No. 15/389,071, now abandoned, filed on Dec. 22, 2016, which is a continuation-in-part of U.S. application Ser. No. 13/165,746 filed Jun. 21, 2011, now abandoned, which claims priority to U.S. Provisional Application No. 61/356,860 filed Jun. 21, 2010.

FIELD OF THE INVENTION

The invention relates to a sensor that is incorporated into a power cutting tool for the purpose of enabling the power tool to both locate blind objects behind a covering surface and perform its usual function.

BACKGROUND OF THE INVENTION

In construction, it is common to need to locate a hidden object such as a beam or a stud behind a wall as part of the construction process. Location sensors, commonly referred to as 'stud finders', have been developed to accomplish this purpose. In normal operation, stud finders are used to locate a hidden beam or stud and the area is then marked with a pencil or other marking device. Although this is not so much of an issue when looking for studs within a wall, this method becomes more difficult when, for example, searching for the location of light fixtures within a ceiling.

Wiring and other components for electrical, networking or other such systems in a residential or commercial structure are installed prior to applying the sheet material, such as drywall. Although much can be done prior to application of the sheet material, the openings for some items, such as ceiling fixtures and outlet/switch boxes are typically cutout after positioning and tacking the sheet material in place. These installations require the removal of a portion of the sheet material just outside the boundaries of the fixtures and electric boxes.

The problems encountered in the removal of the wall covering for a wall outlet or switch are surmountable, but time-consuming and require modest effort using existing technologies. The more difficult task arises when removing the sheet material for ceiling light fixtures. This task requires working overhead while standing on a ladder, scaffolding, stilts, or similar equipment. In order to cut out the drywall from the proper location, one of two possible procedures is used. The most common way is to measure the distance from the walls to the center of the installed fixture before hanging the drywall sheet. Once the sheet is tacked in place, the measured distance in marked on the sheet to locate the position of the center of the fixture behind the drywall, and a bit is used to penetrate the drywall by placing the high speed cutting tool bit at the marked location and cutting laterally until the bit stops on the edge of the fixture. The bit is then withdrawn and inserted through to the outside of the fixture's edge. Using the edge as a guide, the drywall inside the fixture is cut out by routing in a counter-clockwise motion. In an alternate fashion, the precise location of the fixture is measured and marked on the to-be-installed sheet of drywall and the area is cutout using those markings. Either way it is a time-consuming, frustrating task, and error prone task requiring the use of both of the installer's hands and two additional tools (i.e. a tape measure and marking instrument). Other methods are known in the trade, however all of them require switching tools while standing on a ladder, scaffolding, etc.

The safety problems associated with the prior methods as well as the additional time and effort expended has been resolved by using the disclosed invention that incorporates a sensor for locating objects behind sheet material with various cutting tools, e.g. high-speed cutting tools (also known as SPIRAL SAW™ routers, drywall SPIRAL SAW™ routers, drywall routers, drywall cutout tools, etc.) as well as reciprocating and oscillating saws.

SUMMARY

A high speed cutting tool having a body containing a bit receiving area at one end and a battery area, providing power to the motor and electronics, at a second end distal to the bit receiving area. The body also contains a motor and electronics with a multi-position exterior switch connected to the electronics. An integrated sensor unit permanently attached to the exterior of the body contains at least one sensor and has a flat outer surface. The flat outer surface is equidistant to or beyond the exterior of the body delineated by a linear line along the flat outer surface. At least one sensor is contained within the sensor unit to transmit and receive signals to detect the characteristics of objects hidden by sheet material, which are at least one from the group of object density, conductivity, distance from said sensor, object identification.

The high speed cutting tool can have at least one indicator that responds to readings received from each of the at least one sensor. The indicator(s) is from the group of audio and visual. The sensor unit is preferably proximate the bit receiving area, level with or below the bit receiving area collar. The sensor unit further incorporates a marking point positioned to contact sheet material upon tilting the body toward the sheet material. The transmitted signal of each of the at least one sensor has an adjustable signal strength that can be controlled by a display screen or other means.

DESCRIPTION OF THE INVENTION

Brief Description of the Drawings

FIG. 4 is a side view of an alternate embodiment having a trigger as well as a sensor unit and marker placed toward the base of the cutting tool, in accordance with the invention;

FIG. 5A is a side view of the drywall high speed cutting tool having a sensor on the end of a flexible arm, in accordance with the invention;

FIG. 5B is a front view of the drywall high speed cutting tool of FIG. 5A, in accordance with the invention;

FIG. 6 is a side view of the drywall high speed cutting tool having an affixed sensor/marker located in the handle in accordance with the invention;

FIG. 9 is a side view of a sensor unit, having a marking unit, on a flexible arm and movable around the body of the router in accordance with the invention;

FIG. 10A is a front view of a drywall router having an affixed sensor/marker incorporated into the bottom of the router in accordance with the invention;

FIG. 10B is a side view of the router of FIG. 10A in accordance with the invention;

FIG. 11 is a side view of a drywall router having a removable sensing unit in accordance with the invention;

FIG. 12 is a side view of a router having an extendable sensor/marking unit in accordance with the invention;

FIG. 13 is a front view of the sensing unit of FIG. 12 in accordance with the invention;

FIG. 14 is a side view of a router having a sensor recessed into the top of the router in accordance with the invention;

FIG. 15 is a side view of a router, having a removable, plug-in sensor on the end of a flexible arm in accordance with the invention, FIG. 16 is a side view of an alternate sensor unit design for use with the slide of FIG. 12 in accordance with the invention.

DETAILED DESCRIPTION OF THE INVENTION

Definitions

Figure 1:
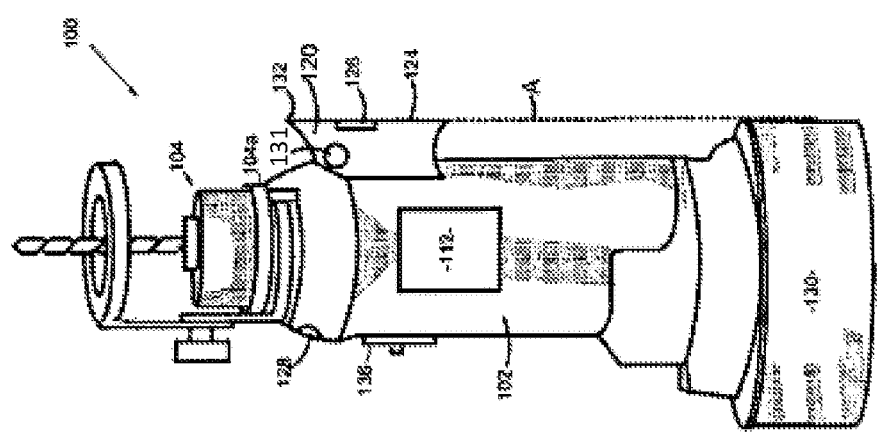
FIG. 1 is a side view of a drywall high speed cutting tool having a sensor positioned at the operational end, in accordance with the invention.

As used herein the term "marking device" shall refer to any device that will transmit a mark to sheet material such as drywall. This includes a punch, ink, pencil or any other device that will leave a mark, indicating a location.

As used herein the term "sensor" or "detector" shall refer to a device, including all required electronics and equipment, capable of detecting an object behind sheet material. The sensor's mode of operation can be, but is not limited to, inductive, capacitive, photoelectric and/or ultrasonic methods. Examples of items to be detected are recessed lighting fixtures, electric boxes, studs, rebar, live wiring etc., which are manufactured from various materials such as metal, wood and plastic.

As used herein the term "sensor unit" or "detector unit" includes all of the sensor(s) with accompanying electronics and the sensor(s) housing or casing, protecting the sensor. In removable embodiments, the sensor unit will also include the electrical connectors and means of attaching the sensor unit to the tool. A sensor unit can contain one or more sensors to accommodate the end use. The design of the sensor housing is, in and of itself, not critical as long as the flat outer surface of the sensor and the marking device clear the tool body during use. Sensors can be of any type, as well known in the art at present and that may become available in the future. As used herein the term "power source" shall refer to any means from which a tool receives power, for example solar, battery, or regular alternating current. When power sources other than alternating current are used, the applicable solar panels, battery packs, etc. that are required will be evident to those skilled in the art.

As used herein the term "switch" shall refer to any device, switch, button, rotating, sliding or rocking, trigger, etc. that can be placed in two or more positions to activate one or more features of the tool. The switch can be used to activate both the high speed cutting tool and the sensor either individually or in tandem.

As used herein the term "cutting tool" refers to any hand tool having a bit or blade that can be used to cut sheet material, including but not limited to reciprocating, spiral, and oscillating saws.

As used herein the term "sheet material" shall refer to any material that covers the walls and/or ceilings of a structure. Drywall, wallboard, gypsum board, plasterboard and paneling are common terms for sheet material used for covering walls and ceiling.

As used herein, the terms "transceiver", "receiver" and "transmitter" refer to any electronics consisting of one or more units that can transmit and read the transmitted signal upon its return.

Drywall high-speed cutting tools, also known as SPIRAL SAW™ routers, high-speed rotary cut-out tools, routers or high-speed drywall routers are high-speed tools commonly used by tradesmen for cutting openings in drywall in order to expose electrical switch boxes, outlet boxes, heating and air conditioning vents, as well as a myriad of other construction applications. Typically these small handheld units are designed to be operated in a freehand manner to penetrate drywall and to cut openings for utilities and fixtures hidden behind it.

One of the more common uses for these high-speed cutting tools is the cutting out of drywall which is covering installed ceiling light fixtures. This requires the user to work overhead while standing on a ladder, scaffolding, stilts, or similar equipment. In order to cut out the drywall from the proper location, one of two possible procedures is currently used. The most common way is for the user to measure from the walls to the center of the installed fixture before hanging the drywall sheet. Once the sheet is tacked in place, the user re-measures and marks to locate the position of the center of the fixture on the drywall surface, penetrates the drywall placing the bit at the marked location, and cuts laterally until the bit stops on the edge of the fixture. The bit is then withdrawn and inserted through to the outside of the fixture's edge. Using the edge as a guide, the drywall inside the fixture is cut out by routing in a counter-clockwise motion. In an alternate fashion, the user measures the fixture location and transfers those measurements by marking the precise location of the fixture on the to-be-installed sheet of drywall. Cutouts are then made using those markings. Either way it is a time-consuming task requiring the use of both the user's hands and two additional tools (i.e. a tape measure and marking instrument). Other methods are known in the trade, however all of them require switching tools while standing on a ladder, scaffolding, stilts etc.

In using other tools, such as drills and reciprocating saws, a similar need is apparent where the measuring and locating tasks are required in addition to actions required for the drilling/cutting operation itself.

The disclosed sensor is, in one embodiment, integral to the tool and in an alternate embodiment is an attachment to the tool.

The high speed cutting tool 100 has a body 102 with a bit receiving area 104 at one end and a battery area 130 at the opposing end. The electronics, motor and other operating mechanisms are contained within the body 102 of the high speed cutting tool 100.

In any of the disclosed embodiments the switch operating the high speed cutting tool, sensors and indicators, can be combined into a single switch or divided into separate switches. When the high speed cutting tool, indicators and sensor controls are combined, multi-positional switches, versus dual-position switches, are used and examples of the operation are as follows:

In one example embodiment the switch has two positions with the first position being off and the second position activating the high speed cutting tool. Additional switch(s) would be used to activate the sensors and indicators.

In another example embodiment, the switch has three positions: the detector is activated in the first position, all components are off in the middle (second) position, and in the third position the high speed cutting tool is activated. In position 3, the detector would be deactivated or not, depending upon manufacturing decision.

With a four position switch, an example would be the power off in the first position and the detector activated in the second position. By moving the switch further to the third position, the high speed cutting tool is activated and the detector is deactivated. By moving the switch to the fourth position, both the high speed cutting tool and the detector are activated.

It should be noted that the first position of the switch can be toward the bit receiving area, toward the battery, or toward one side. The use of first and second is for explanatory purposes only with respect to direction and should not be interpreted as absolutes. The switch can slide, rock, rotate or change position in any other manner.

In embodiments where the sensors and indicators are controlled with one or more switches separate from the on/off switch, a dual positional switch would be used. Separate switches can be used for the sensors and indicators or they can combined into a single multi position switch with, for example, 1) sensor on, indicator off, 2) both sensor and indicator on, 3) sensor off, indicator on. Other combinations can be used as known to those skilled in the art. Further, separate switches can be used if there are multiple sensors that require separate operation. The cutting tool can also have a switch that controls the activation of the high speed cutting tool or detector similar to the switches on drills that change the direction of the drill from forward to reverse. Other combinations will be evident to those skilled in the art.

The marking devices herein are illustrated in some embodiments as incorporated into the body of the sensing unit and in other embodiments separate from the sensing unit. It should be noted that the determination as to which embodiment to use is based upon manufacturing decisions and not functionality.

The sensors and indicators are preferably powered by the battery, although alternate power sources could be used. Preferably the sensors units in all embodiments have the ability to control the strength of the signal as well as differentiate between various materials, such as wood, plastic, live wires, etc. In embodiments not containing a screen, the type and/or location of the material detected can be indicated by audio or visual means. By controlling the setting of the signal, the object's distance from the sensor can be determined. This is advantageous in that the device can be set to locate only items at the sought-after distance from the surface of the sheet material. For example, the sensor could be set to only react to a two (2) inch distance from the surface, thereby detecting the edge of a recessed lighting fixture and ignoring any wiring to the back of the fixture.

The sensors can be specifically designed to serve a single purpose, such as proximity or material identification with individual switches, with separate or combined corresponding controls. Alternatively, sensors having the combined capability can be used, examples of which are noted below and incorporated herein. When a single sensor is used for having multiple capabilities, or modes, the incorporation of a screen is advantageous as it permits easier programming. Dials or buttons can also be used and, while less visual programming capabilities are provided, will reduce cost.

One or more sensors can be incorporated into the sensor units to provide the detection required. The capacitive proximity sensors, such as sold by Fargo Controls, Inc., detect metallic and nonmetallic objects and permit the presetting of distance from the sensor. An example of the sensor's ability to detect live wires and metal is sold as the Zircon Corporation MultiScanner i520. The technology used in metal detectors, preferably with discrimination, very low frequency, pulse induction or beat-frequency oscillation can also be used in one or more sensors.

Similar to standard stud finders, the sensor unit used in the disclosed device can have easily visible indicator LED lights that indicate that the sensor is operable, when the object has been found, and when live wires have been detected. The indicator LEDs can be on the body of the tool or on the sensor unit.

Audio alerts having multiple sounds with a separate and distinct sound for live wires can be incorporated into any of the embodiments indicating that the object has been detected. Frequency or speed of indicating sounds can also be used to differentiate between materials, including live wires. This serves as an additional safety feature in the event the user is not paying attention to the LED indicating the live wire's presence.

In order to program the responses, a screen can be provided with the ability to scroll through options and set the modes. It is preferred that the screen be touch activated due to size restrictions, however buttons can also be used. The screen can be curved to match the curvature of the body, recessed into the body or extend slightly from the body. All electronics are connected to a microprocessor to enable programmability.

The use of the metal detector technology, including the screen, distance indicator, visual display etc., as disclosed in embodiments herein, can be incorporated in any of the disclosed embodiments in whole or in part. Additionally, a microprocessor can be incorporated to enable programming of desired densities, depth or distance determination, indicators, etc. through either use of a USB port or control panel.

The above technologies can also be combined as multiple sensors in a single sensor unit or multiple sensor units.

Although the drawings and descriptions are predominately directed to a high speed cutting tool, it should be noted that any cutting tool with a body can incorporate the disclosed technology and design modifications will be obvious to those skilled in the art.

The sensors that are incorporated in cutting tools can be activated through a switch, trigger or button on the sensor or at some location convenient for manufacture on the tool.

Figure 2:
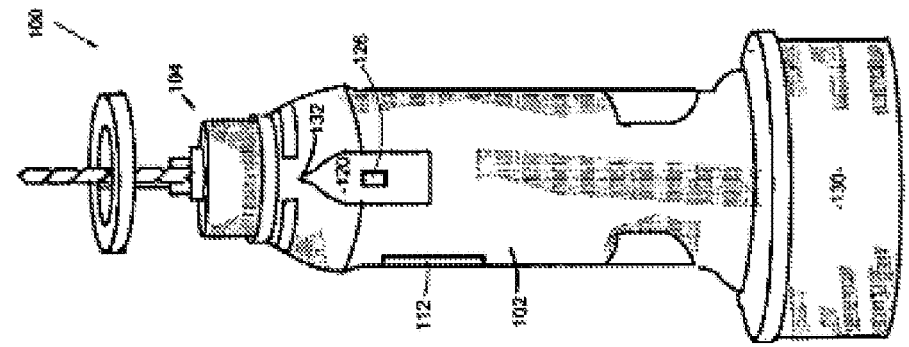
FIG. 2 is a front view of the high speed cutting tool of FIG. 1 in accordance with the invention.

In FIGS. 1-2 the sensor unit 120 is adjacent to the body 102 of the high speed cutting tool 100. In some high speed cutting tool designs, a portion of the sensor electronics can be recessed to whatever extent required. The sensor unit 120 must extend a sufficient distance from the body 102 to permit the sensor unit surface 124 to clear any protrusions that are in a direct linear line A on the high speed cutting tool body 102, in order for sensor unit surface 124 to come in contact with the sheet material. As illustrated in FIG. 1, the sensor unit surface 124 is located equidistant to the linear line indicated as A, running to the rechargeable battery area 130, although in other embodiments the sensor unit surface 124 can extend beyond the linear line A, placing the sensor unit surface 124 beyond the battery area 130. The extent to which the sensor unit 120 extends from the body 102 will be dependent upon the tool, size of sensing device, and type of securing method and will be evident to those skilled in the art. In this embodiment the sensor unit 120 is formed at time of manufacture and although not removable, an access panel to the interior of the sensor unit 120 can be provided if desired.

The location of the sensor unit 120 is proximate the collar 104*a* of the bit receiving area 104 to permit the marking point 132 to contact the sheet material upon tilting of the high speed cutting tool 100. Placement of the sensor unit 120 so that the marking point 132 is around the midpoint of the body 102 prevents contact prior to the bit receiving area 104 coming in contact with the sheet material. The marking point 132 should be level with, or slightly below the collar 104*a* of the bit receiving area 104.

The sensor unit 120 in this embodiment contains the proximity sensor 126 and audio indicator 131, with the visual indicator 128 on the reverse side for easy viewing during use. The visual indicator 128 can be included in the sensor unit 120, however the positioning is not as convenient for the user. The exact placement of the proximity sensor 126 and audio sensor 131 within the sensor unit 120 is dependent upon the size and type of sensors being used. For example, in FIG. 1 the audio indicator 131 is illustrated on the top of the side of the sensor unit 120, however it can be placed at any location convenient for manufacture. The proximity sensor 126, however, must be placed on the sensor unit surface 124 in order to fully contact the sheet material. As the marking point 132, described hereinafter, is part of the sensor unit 120, the sensor unit 120 must be positioned near the bit receiving area 104 to allow for the marking point 132 to contact the sheet material upon tilting the body 102.

The marking point 132 in this embodiment is the upper end of the sensor unit 120 and has been molded to form a sharp point. As the material of manufacture of the high speed cutting tool 100 is the standard plastic used with tools, such as drills, saws, etc., the hardness is sufficient to cause the marking point 132 to penetrate the sheet material, leaving a visible mark. Although depending upon the tool, it is preferable that only a tilting of the high speed cutting tool 100 in the range of ten (10) to fifteen (15) degrees would bring the marking point 132 in contact with the sheet material.

The length of the marker can be about 3/32 inches, although the location will affect the length. The criteria are that the marker has sufficient length to contact the sheet material, does not interfere with the flat outside surface of the sensor unit, and has the ability to leave an indicating mark. The indicating mark can be left by a sharpened point making an indentation, by ink or pencil that would fit into a holder or by other means that would be obvious to one skilled in the art.

It should be noted that the marking point 132 is not mandatory to the functioning of the sensor unit 120 and can be eliminated if desired. If no marker is built into the sensor unit, the user would mark the area indicated by the sensor with a pencil, or other type of marking or punching member.

The example embodiment of FIGS. 1-2 has a screen 112 in communication with a microprocessor to control the motor and sensors. The screen 112 permits the user to determine which sensors are activated, distance of detection from the proximity sensor, tone of audio indicator, etc. The degree of control available is dependent on each indicator and sensor used and will be known to those skilled in the art. The screen 112 is optional and although it provides convenience, it also increases the cost of manufacture. A button switch, dial, multi-positional rotating switch, or other method of controlling the sensors can be incorporated rather than a screen. Although these devices may not provide the same degree of control, they would reduce the cost of the tool. The settings for the sensors and indicators can also be set at time of manufacture at a single setting, e.g. single distance from the sheet material surface.

The example switch 136 illustrated in FIG. 1 is a three position switch 136 as described heretofore. The switch 136 can be of any design convenient for manufacture and designs will be known to those skilled in the art.

The battery is preferably rechargeable and of a type currently used for tools. This would include Lithium ion, NiMH or NiCd, as well as any improvements in the battery arts.

Figure 3:
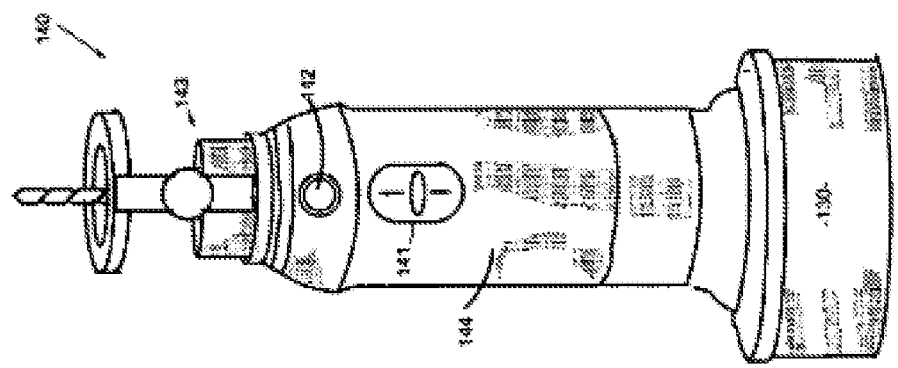
FIG. 3 is a back view of the high speed cutting tool of FIG. 1 in accordance with the invention.

The high speed cutting tool 140 illustrated in FIG. 3 contains all of the features of the embodiments of FIGS. 1 and 2 without a screen 112. The body 144 is illustrated from the side containing the switch 141 and visual indicator 142. The opposing side, containing the sensor unit is not illustrated in this figure, however the design and placement below the bit receiving area 143, would be the same as in FIGS. 1 and 2.

To use the high speed cutting tool 100, the tool is positioned to place the sensor unit surface 124 adjacent to the sheet material and the switch 136 moved to activate the proximity sensor and audio and visual indicators. As known in the art, the sensor needs to receive a baseline reading from the covering surface with no hidden object behind and is then slid across the surface of the sheet material until the sensor(s) are activated, either visually and/or audibly, indicating the target is located. Once an object is found, the high speed cutting tool 100 is tilted to bring the marking point 132 in contact with the sheet material. If necessary, the marking procedure can be repeated as many times as needed to adequately mark the periphery. In some applications, a single mark can be sufficient, while in others multiple marks will be required.

FIG. 4 illustrates a high speed cutting tool 150 that has a handle and uses a variable or multi-speed trigger 152 to operate the high speed cutting tool 150. In this embodiment the sensor unit 160 is located on the bottom portion of the side of the body 154, toward the base. The sensor unit 160 must have a top width TW to extend beyond the collar 156 of the body 154 to enable a clear access path to the drywall. The contact surface 164 of the sensor unit 160 is angled to ensure that the marker 166 can contact the sheet material without interference from the body 154 of the high speed cutting tool 150. The marker 166 extends from the sensor unit 160 a sufficient amount to mark the sheet material. Depending upon the top width TW, the marker 166 could require a slight angle in order to enable it to contact the sheet material without interference from the body 154.

To enable contact with the sheet material, the bottom width BW of the sensor unit 160 must be sufficient to clear the battery base 158. Due to the angle of the contact surface 164, the bottom width BW does not need to extend away from the body 154 a sufficient amount to clear the collar 156.

The angle of the contact surface 164 as well as the top width TW and bottom width BW can vary depending upon the tool being used and these variations will be obvious to those skilled in the art.

FIGS. 5A and 5B illustrate an alternate embodiment of the high speed cutting tool 200 wherein the sensor unit 220 is attached to a flexible arm 222 that extends from the body 202. The body 202 can be provided with an arm holder 204 dimensioned to receive the flexible arm 222 and prevent its movement unless removed from the holder 204. The holder 204 can be any means convenient for manufacture such as dual prongs, a U-shape with an open side, hook and loop material, etc. The flexible arm 222 enables the sensor unit 220 to be positioned in relationship to the bit 206, thereby enabling the user to not only estimate the distance from the light or other fixture to the bit 206, but maintain the sensor unit 220 adjacent to the surface being cut during use. As with the prior embodiment, the sensor unit 220 is connected directly to the high speed cutting tool 200's power source.

The flexible arms of FIGS. 5A and 5B are good embodiments for cutting tools that are not as conducive to the embodiments of FIGS. 1-3.

The high speed cutting tool 250 located in FIG. 6 has the sensor/marking unit 260 on the handle 252. The hidden object would be located with the sensor 253 and then marked using marking unit 251. The handle 252 can include lights 254 to indicate the operation of the high speed cutting tool 250, the sensor unit 260, and the combination of which are used for detecting and revealing hidden targets. The high speed cutting tool 250 can further incorporate an LCD screen 270 in the body to indicate (graphically) a live image of the sought-after target (i.e. the light fixture, outlet box, etc.) providing live feedback of the high speed cutting tool bit's 272 location relative to the target. This can be accomplished through use of ultra sound, sonar, etc. to provide the feedback. Alternatively, RFID tags can be applied to the fixture at the time of installation and the feedback to the screen would be based upon data read by an RFID scanner. This would enable the operator to pinpoint exactly where to penetrate the sheet material relative to the position of the target behind the sheet material. The protruding marker unit 251 on the sensor/handle would permit the user to mark the routing location after determining the same.

Figure 7:
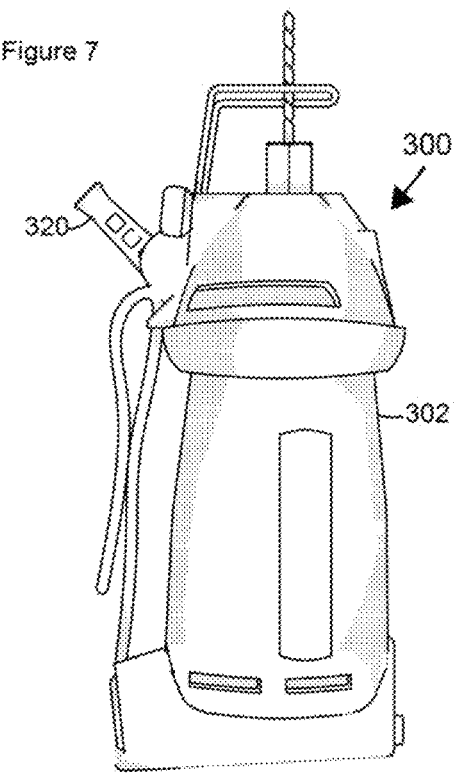
FIG. 7 is a side view of a drywall high speed cutting tool having a built-in telescoping sensor in the extended position in accordance with the invention.
Figure 8:
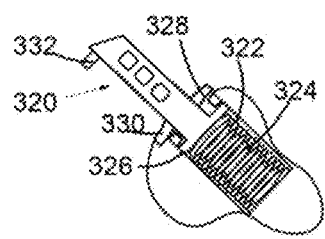
FIG. 8 is a cut away side view of an example of the telescoping sensor of FIG. 7 in accordance with the invention.

In FIGS. 7 and 8 the sensor unit 320 telescopes into a cavity 322 within the high speed cutting tool body 302. The cavity 322 is preferably dimensioned to maintain a portion of the sensor unit 320 exposed to enable the sensor unit 320 to be pulled out. Alternatively the cavity 322 can contain a spring 324 to push the sensor unit 320 up above the body 302 of the high speed cutting tool 300. In the example illustrated herein the sensor unit 320 has a flange, or flanges, 326 that prevent the sensor unit 320 from sliding out of the cavity 322 by interacting with ridge 328. A slide lock 330 interacts with locking flange 332 to maintain the sensor unit 320 recessed during non-use. Once the slide lock is removed from the opening of the cavity 322, the spring 324 pushes the sensor unit 320 out. This is an example only and there are other means for retaining a telescoping unit in a recessed or extended position and are known to those skilled in the art.

In an alternate embodiment to this and other designs, multiple sensors can be contained within a sensing unit or multiple sensing units containing one or more sensors can be used and positioned to sense objects at different planes to the sensor body. For example, a first sensor unit at the top can be positioned to be used to locate light fixtures in the ceiling while a second sensor unit on the side can be positioned to be used to locate wall outlets.

The integral sensor unit 420 of FIG. 9 is attached to a rail 424 through use of slide 426. The use of the slide 426 and rail 424 enable the sensor unit 420 to be positioned at any location around the circumference of the high speed cutting tool body 402. Power to the sensor unit 420 is through energizing the rail 424, internal batteries, or separate plug in lead that is plugged either directly into the high speed cutting tool body or to an outside electrical source. In this embodiment, the flexible arm 430 enables the sensor unit head 432 to be positioned facing in the optimal direction. It should be noted, however, that the rail 424 and slide 426 can be used with any sensor unit disclosed herein. The sensor unit 420 in this embodiment also incorporates an optional marking device 436. The marking device 436 can be any device that will place a mark on the material being marked and can include a scribe, pencil, ink, etc. and can be used on any embodiment disclosed herein. As the arm 430 is flexible, the marking device 436 must be of the type that can make a mark without the exertion of sufficient pressure to move the arm 430.

In FIGS. 10A and 10B the sensor/marker unit 462 has been partially recessed into the base 470 of the body 460 with the sensor/marker unit 462 being located at the base 470 and the marking end 466 extending from the sensor/marker unit 462. In this embodiment the user can tilt the high speed cutting tool body 460, placing the sensor/marker unit 462 in a position to locate and mark the position of the blind object being sought behind the drywall or other sheet material. Once located, the high speed cutting tool 460 is tilted to bring the marking end 466 into contact with the sheet material. Although the sensor/marker unit 462 is illustrated herein as being on the base 470, necessitating a 180 degree rotation in order to perform the cutout operation, the sensor/marker unit 462 can also extend along the side of the body, requiring just a 90 degree rotation. The switch 468 is positioned on the reverse side of the sensor/marker unit 462, however the switch 468 can be positioned at any location on the high speed cutting tool that is convenient for use and manufacture.

In the embodiment illustrated in FIG. 11, the sensor unit 502 requires no structural changes to the tool and is therefore applicable for use on existing cutting tools 500. The sensor unit 502 is affixed to a snap-on band 504 that enables the sensor unit 502 and band 504 to be removed from the high speed cutting tool body 506. Alternatively, the sensor unit 502 could be affixed to a hook and loop band, cinching, or other type band or securing device that is affixed to the high speed cutting tool body. Not only does this embodiment enable the sensor unit 502 to be used with existing tools, it further enables the sensor unit 502 to move around the tool body 506 to the optimal position. It should be noted that any of the sensor unit configurations can be used with the band 504. A battery pack in either the body of the sensor unit or on the band would most likely be incorporated when using any of the removable sensor embodiments. Power, however, could also be through a separate electrical connection that is connected directly to a "powered jack" or power socket in the high speed cutting tool body 506 or other electrical source.

The embodiment illustrated in FIG. 11 does not have a marker, however, as with all embodiments, the marker can be added or removed depending upon manufacturing decisions.

The high speed cutting tool of FIGS. 12 and 13 incorporates a sensing/marking unit 550 that extends, through the use of a slide 562, release button, etc., similar to the release of a box cutter's blade. The sensor/marking unit 550 is equipped with a marking end 558 and sensor 554, slides down the enclosed track 552 within or on the high speed cutting tool body 556. With the push of a thumb, the sensing/marking unit 550 will extend just beyond the tip of the high speed cutting tool bit and lock in position, activating the sensing/marking unit 550 through use of a pressure switch or other means known in the art. Once the light fixture, outlet box, etc. has been detected as shown by indicator 560 and audio indicator 561, a mark is made by pushing against the cover material with marking end 558. After marking, the sensing/marking unit 550 is retracted to its home position, de-activating the sensing unit 550. Light indicator 560 and audio indicator 561 can be incorporated into any of the embodiments disclosed herein. The dimensions of the sensor/marker must be sufficient to carry the required hardware as well as retain stability of the marking unit and the exact dimensions will be easily determined by those skilled in the art. Although the marking/sensor unit 550 is illustrated moving within the enclosed track 552, it should be noted that it can also slide along an open track.

In FIG. 14 the sensor unit 600, containing sensor 606, has been recessed into the top of the high speed cutting tool body 602. In this embodiment the detector signal is required to be of sufficient strength and focused direction to bypass the high-speed cutting tool body, travel a few inches to the drywall, penetrate the sheet material and detect the light fixture/outlet box behind it. Although the sensor unit 600 could be positioned on the other side of the high-speed cutting tool, it would require a highly focused beam to avoid the supports 604. In FIG. 14 the power is provided by a standard power cord plugged into an outlet. Although this does not provide the maneuverability of a battery-operated tool, in some applications this can be preferable.

In FIG. 15 the sensor unit 652 has a plug 654 on the opposing end of the arm 653. The plug 654 is placed in a receiving jack or socket 656 that is wired directly into the electrical system of the high speed cutting tool body 650. This enables the sensor unit 652 to be removed when not in use. It should be noted that where a sensor unit is on a flexible arm 653 it can be interchanged with a fixed rigid sensor unit and vice versa. In FIG. 15 the power is provided by a standard power cord plugged into an outlet. Although this does not provide the maneuverability of a battery-operated tool in some applications this can be preferable.

In FIG. 16 an alternate sensing/marking device 570 is disclosed for use with the slide 552 of FIG. 12. The sensor unit 574 and marking device 576 slide down into the body 572 of the unit 570. At the time of marking, the sensor unit 574 and marking device 576 would be slid upward, out of the body 572 and, when the sensor unit 574 indicates the presence of a material behind the covering surface, a visual indication can be provided through indicator 580 and the location is marked with the marking device 576. Once complete, the marking device 576 and sensor unit 574 are slid back into the body 572. Optimally there would be a cap 578 that would be placed over the sensor unit 574 and marking device 576 within the body 572 when not in use to prevent debris from hindering the functionality.

Figure 17:
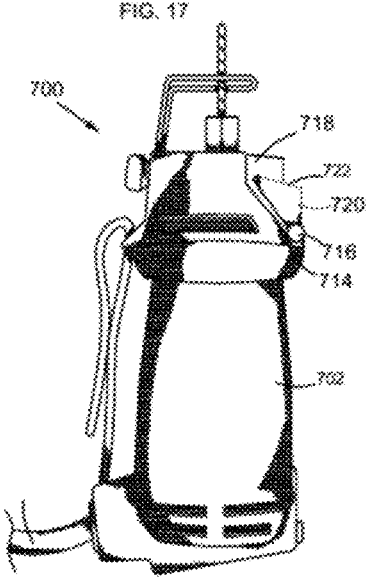
FIG. 17 is a side view of an alternate embodiment having a cavity to receive a pivotal sensor and marking unit in accordance with the invention.

In FIG. 17 the body 702 of the high speed cutting tool 700 had been manufactured with a cavity 718 to receive the sensor unit 720. The cavity 718 must be of sufficient size to retain at least a majority of the body of the sensor unit 720 and can be of any convenient configuration. The sensor unit 720 can rotate at pivot point 716 and be connected directly into the power source of the high speed cutting tool 700 through wiring 714. The sensor unit 720 can be retained in the open and closed positions in a number of ways known in the art, such as magnets, springs and snap locks. Alternatively, the sensing unit 720 can be affixed in the open position. In FIG. 17 the power is provided by a standard power cord plugged into an outlet. Although this does not provide the maneuverability of a battery-operated tool, in some applications this can be preferable.

The sensor unit 720 can employ the standard stud finder technology as the surface 722 can, when rotated to a predetermined position, contact the sheet material. Additionally, the sensor unit 720 can be equipped with sensing technology such as found in metal detectors, thereby enabling the beam to be parallel with the cutting bit or blade as seen in FIG. 14.

Figure 18:
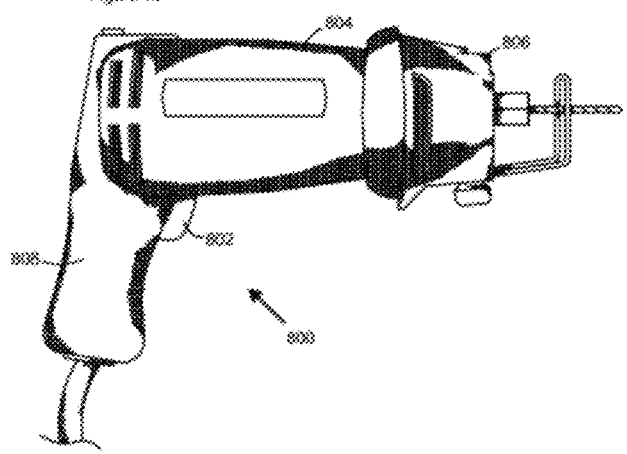
FIG. 18 is a side view of an alternate embodiment having a handle with a trigger at right angles to the high speed cutting tool body in accordance with the invention.

In FIG. 18 a pistol grip handle 808 extends at an angle from the body 804 of the high-speed cutting tool 800 with the cord, or in alternate embodiments a battery pack, on the opposing end. The trigger 802 can be multi stage or a single on/off with separate controls used to activate the sensor 806. In this embodiment the sensor/marking device 806 is a single unit, however any of the disclosed sensor or sensor/marking combinations can be incorporated on this, and any other, embodiment.

Figure 19:
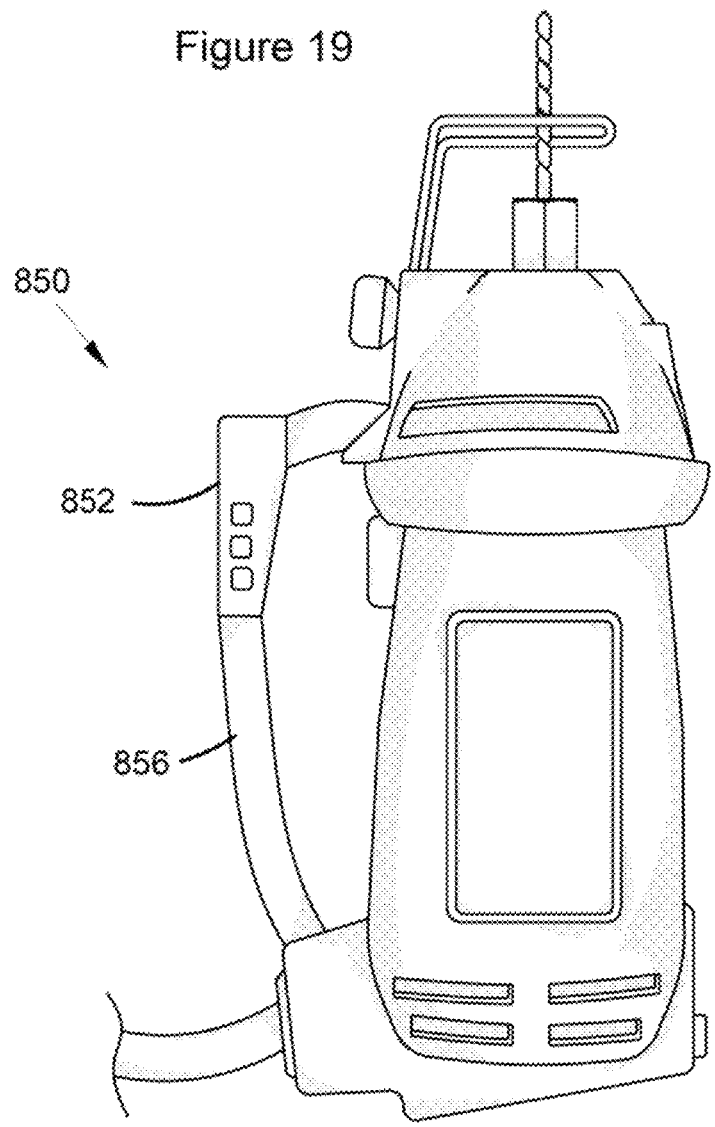
FIG. 19 is an additional embodiment with a screen in accordance with the invention.

In FIG. 19 the high speed cutting tool 850 is similar to that illustrated in FIG. 6, however the handle 856 is on the opposite side and the sensor unit 852 does not have a marking device. As noted heretofore, any feature described on another embodiment can be used on any of the disclosed embodiments and therefore the marking device could readily be added to this Figure. In FIG. 19 the power is provided by a standard power cord plugged into an outlet. Although this does not provide the maneuverability of a battery-operated tool, in some applications this can be preferable.

It should be noted that while the drawings illustrate a single sensor per location, multiple sensors and multiple locations can also be incorporated.

It is advantageous in any of the foregoing embodiments to have a sensor with an adjustable distance-sensing mechanism through the use of a touch screen, multi-position switch, toggle switch, thumb wheel switch or other types of switches currently available. The adjustable distance preferably includes the ability to set ranges and types of materials. This will enable a specific object that is a known distance behind the sheet material to be detected but prevent sensing of irrelevant objects at a distance either nearer or further than that of the tool's setting. For example, only objects that are located between 1 and 4 inches behind the covering sheet material will be detected. The ability to ignore objects not within the designated range or type of material enables the detector to more accurately locate the items to be approached or avoided. Although the majority of the time the fixtures and other materials at a shallower distance than the object to be located should be avoided, there are times such as when foil covered insulation has been applied, that this setting would be advantageous. The detector can also be manufactured to detect all objects that are at a maximum distance, thereby cutting the cost of the detector. The increments of the ranges would vary depending upon the cost, size, etc. and will be dependent upon manufacturer. Although any of the foregoing embodiments can be used with the variable detector, those embodiments having the ability for the sensor to be close up and touching the sheet material, would produce the greatest reliability with the least cost and energy use. As known in the art, the sensor needs to receive a baseline reading from the covering surface with no hidden object behind it and then slid across the covering surface until alerted with the discovered target, at which point one uses the marking end to push and mark the target spot.

It should be noted that any of the sensors herein can incorporate a light beam or laser to provide a visual component, as well as an audio one, to confirm and/or indicate the location where the sensing beam is striking. Also, it should be noted that where a sensor is on a flexible arm it can be interchanged with a fixed rigid sensor and vice versa. Additionally, a marking device can be included on any of the foregoing embodiments.

Although a single sensor has been described heretofore in each embodiment, multiple sensors, placed in the disclosed manner, can also be incorporated.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language of the present invention or inventions should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. An electric cutting and marking tool for sheet material, comprising:
    a body comprising an outer surface having a circumference;
    a sheet material cutting bit securely retained by the body;
    at least one sensor unit adjacent to the body and extending outside the circumference of the outer surface of the body, with the at least one sensor unit containing at least one sensor, and with the at least one sensor unit comprising a marking device;
    wherein the at least one sensor is operable to transmit and receive signals to detect characteristics of objects behind sheet material, wherein the characteristics comprise at least one from the group of object density, conductivity, depth, and object identification; and
    a device secured to the body, wherein the device is placeable in multiple positions, wherein a first position of the multiple positions is an off position, a second position of the multiple positions activates the sheet material cutting bit, and wherein a third position of the multiple positions activates the at least one sensor unit.

2. The electric cutting and marking tool of claim 1 further comprising at least one indicator responsive to the at least one sensor.

3. The electric cutting and marking tool of claim 2 wherein the at least one indicator is at least one from the group of audio and visual.

4. The electric cutting and marking tool of claim 1 wherein the body further comprises a collar extending from the body outer surface, and wherein the at least one sensor unit extends outwardly of the body outer surface beyond the collar.

5. The electric cutting and marking tool of claim 4, wherein the at least one sensor unit has a top width and a bottom width, and wherein at least the top width extends further from the outer surface of the body than the collar does.

6. The electric cutting and marking tool of claim 1 wherein the at least one sensor receives power from a battery.

7. The electric cutting and marking tool of claim 1 wherein the marking device is positioned to contact the sheet material upon tilting the body toward the sheet material.

8. The electric cutting and marking tool of claim 1 further comprising a screen to display images received from the at least one sensor.

9. The electric cutting and marking tool of claim 1 wherein the transmitted signal of the at least one sensor has an adjustable signal strength.

10. An electric cutting and marking tool for sheet material, comprising:
    a body comprising a first end and an outer surface having a circumference;
    a sheet material cutting bit securely retained by the body;
    at least one sensor to transmit and receive signals to detect characteristics of objects behind sheet material, the characteristics being at least one from the group of object density, conductivity, depth and object identification;
    a sensor unit adjacent to the body, extending outside the circumference of the outer surface of the body, containing the at least one sensor and having a first end, a second end, a flat outer surface, and a marking device to contact the sheet material upon tilting the body toward the sheet material;
    a device secured to the body, wherein the device is placeable in multiple positions, wherein a first position of the multiple positions is an off position wherein the sheet material cutting bit and the at least one sensor are not activated, wherein a second position of the multiple positions activates the sheet material cutting bit, and wherein a third position of the multiple positions activates the at least one sensor unit; and at least one indicator providing an audio or visual indication upon the characteristics being detected by the at least one sensor.

11. The electric cutting and marking tool of claim 10 wherein the at least one sensor receives power from a battery.

12. The electric cutting and marking tool of claim 10 further comprising a screen to display images received from the at least one sensor.

13. The electric cutting and marking tool of claim 10 wherein the transmitted signal of the at least one sensor has an adjustable signal strength.

14. The electric cutting and marking tool of claim 10, wherein the at least one sensor unit is not activated in the second position.

15. The electric cutting and marking tool of claim 10, wherein the sheet material cutting bit is not activated in the third position.

16. The electric cutting and marking tool of claim 10, wherein the marking device is not in contact with the sheet material when the at least one sensor unit is activated.

17. The electric cutting and marking tool of claim 10, wherein the marking device is positioned to contact the sheet material when the body is tilted toward the sheet material and after the characteristics are detected by the at least one sensor.

* * * * *